(12) United States Patent
Weiß et al.

(10) Patent No.: US 11,599,758 B2
(45) Date of Patent: *Mar. 7, 2023

(54) SHEET-LIKE PRODUCT AND METHOD FOR AUTHENTICATING A SECURITY TAG

(71) Applicant: Authentic Vision GmbH, Wals (AT)

(72) Inventors: Thomas Weiß, Wals (AT); Thomas Bergmüller, Wals (AT)

(73) Assignee: Authentic Vision GmbH

(*) Notice: Subject to any disclaimer, the term of this patent is extended or adjusted under 35 U.S.C. 154(b) by 0 days.

This patent is subject to a terminal disclaimer.

(21) Appl. No.: 17/314,310

(22) Filed: May 7, 2021

(65) Prior Publication Data

US 2021/0264231 A1  Aug. 26, 2021

Related U.S. Application Data

(63) Continuation of application No. 16/331,576, filed as application No. PCT/EP2017/072827 on Sep. 12, 2017, now Pat. No. 11,030,501.

(30) Foreign Application Priority Data

Sep. 12, 2016 (EP) ..................... 16188357

(51) Int. Cl.
*G06K 19/16* (2006.01)
*G06K 19/06* (2006.01)
(Continued)

(52) U.S. Cl.
CPC . *G06K 19/06056* (2013.01); *G06K 19/06065* (2013.01); *G06K 19/06075* (2013.01);
(Continued)

(58) Field of Classification Search
CPC ....... A61K 31/704; A61K 36/77; A61P 35/00; C07H 15/256; C07J 63/00;
(Continued)

(56) References Cited

U.S. PATENT DOCUMENTS 5,876,586 A   3/1999  Fukushima et al.
6,135,355 A  10/2000  Han et al.
(Continued)

FOREIGN PATENT DOCUMENTS

CN  101477638 A  7/2009
CN  102509143 A  6/2012
(Continued)

OTHER PUBLICATIONS

Colombian Office Action; Application No. NC2019/0001991; Completed: Jul. 27, 2020; dated Jul. 31, 2020; 17 Pages.
(Continued)

*Primary Examiner* — Thien M Le

(57) ABSTRACT

Sheet-like product and method for authenticating a security tag including a section of the sheet-like product. The sheet-like product includes at least one security feature having optical properties that change with the viewing angle and, and at least one marker, wherein each marker is uniquely attributable to a position on the sheet-like product. The position of the at least one security feature on the sheet-like product is predetermined relative to the position of the at least one marker on the sheet-like product.

21 Claims, 3 Drawing Sheets

(51) Int. Cl.
*G06K 19/10* (2006.01)
*G06K 19/18* (2006.01)

(52) U.S. Cl.
CPC ............. *G06K 19/10* (2013.01); *G06K 19/16* (2013.01); *G06K 19/18* (2013.01)

(58) Field of Classification Search
CPC ....... G06K 19/06056; G06K 19/06065; G06K 19/06075; G06K 19/10; G06K 19/16; G06K 19/18
See application file for complete search history.

(56) References Cited

U.S. PATENT DOCUMENTS

| | | | |
|---|---|---|---|
| 7,267,280 | B2 | 9/2007 | Lubow |
| 8,913,299 | B2 | 12/2014 | Picard et al. |
| 10,252,563 | B2 | 4/2019 | Rich et al. |
| 2003/0125830 | A1* | 7/2003 | Munz ................ G05B 19/4103 700/189 |
| 2003/0191580 | A1* | 10/2003 | Endo ................ G08G 1/096861 340/995.19 |
| 2004/0026508 | A1 | 2/2004 | Nakajima et al. |
| 2005/0006476 | A1* | 1/2005 | Reichenbach ..... G06K 7/10574 235/454 |
| 2005/0018213 | A1* | 1/2005 | Marti ................... G06F 40/174 358/1.15 |
| 2005/0031016 | A1* | 2/2005 | Rosen ..................... H04B 1/69 375/130 |
| 2006/0022059 | A1* | 2/2006 | Juds ................ G06K 19/06056 235/494 |
| 2006/0074954 | A1* | 4/2006 | Hartline .............. G06F 11/1076 |
| 2007/0114907 | A1 | 5/2007 | Chiang et al. |
| 2007/0268977 | A1* | 11/2007 | Wang ................... H04L 5/0007 375/261 |
| 2008/0079805 | A1 | 4/2008 | Takagi et al. |
| 2009/0201504 | A1* | 8/2009 | Ho ................... B01L 3/502761 356/399 |
| 2009/0224052 | A1* | 9/2009 | Liou ................. G06K 7/10722 235/462.41 |
| 2009/0316098 | A1 | 12/2009 | Ishihara et al. |
| 2011/0182464 | A1 | 7/2011 | Lapstun et al. |
| 2012/0211567 | A1 | 8/2012 | Herzig |
| 2013/0153670 | A1 | 6/2013 | Robinson |
| 2013/0207375 | A1 | 8/2013 | Eichenberger et al. |
| 2013/0335463 | A1 | 12/2013 | Chiang et al. |
| 2015/0108220 | A1 | 4/2015 | Gu et al. |
| 2016/0224877 | A1 | 8/2016 | Troesch |
| 2016/0339733 | A1 | 11/2016 | Holmes |
| 2017/0139093 | A1 | 5/2017 | Schmitt et al. |
| 2017/0357737 | A1 | 12/2017 | Li et al. |
| 2018/0111406 | A1 | 4/2018 | Loginov et al. |
| 2018/0192037 | A1 | 7/2018 | Sumi et al. |
| 2018/0272788 | A1 | 9/2018 | Bleiman et al. |

FOREIGN PATENT DOCUMENTS

| | | |
|---|---|---|
| CN | 102597891 A | 7/2012 |
| CN | 102890787 A | 1/2013 |
| CN | 103577868 A | 2/2014 |
| CN | 104428798 A | 3/2015 |
| CN | 105637537 A | 6/2016 |
| CN | 105719563 A | 6/2016 |
| CN | 105793059 A | 7/2016 |
| EP | 2937818 A1 | 10/2015 |
| JP | 2000003124 A | 1/2000 |
| JP | 2002517046 A | 6/2002 |
| JP | 2005345319 A | 12/2005 |
| JP | 2016104527 A | 6/2016 |
| WO | 2013188897 A1 | 12/2013 |
| WO | 2015079014 A1 | 6/2015 |
| WO | 2015150295 A1 | 10/2015 |
| WO | 2016034555 A1 | 3/2016 |

OTHER PUBLICATIONS

Japanese Office Action; Application No. 2019/513904; dated May 19, 2020; 4 pages.
Chilean Office Action; Application No. 201900603; Completed: Mar. 19, 2020; 12 pages.
Extended European Search Report; Application No. 16188357.4; Completed: Feb. 27, 2017; dated Mar. 9, 2017; 7 Pages.
U.S. Office Action; U.S. Appl. No. 16/331,576; dated Feb. 19, 2020; 13 Pages.
Chinese Office Action; Application No. 201780055689.X; dated Aug. 31, 2021; 18 Pages.
Japanese Rejection Notice; Application No. 2021-110997; dated Jul. 12, 2022; 3 Pages.
Chinese Office Action and Search Report; Application No. 201780055689.X; dated Aug. 15, 2022; 10 Pages.

* cited by examiner

SHEET-LIKE PRODUCT AND METHOD FOR AUTHENTICATING A SECURITY TAG

TECHNICAL FIELD

The present teaching relates to a sheet-like product that can be used as a raw material for producing security tags, which when arranged on products or product packaging provide a means for optical authentication of that product or packaging. Specifically, the present teaching relates to a sheet-like product comprising: at least one security feature having optical properties that change with the viewing angle and at least one marker, wherein each marker is uniquely attributable to a position on the sheet-like product, wherein the position of the at least one security feature on the sheet-like product is predetermined relative to the position of the at least one marker on the sheet-like product. Such security tags are generally used to combat product counterfeiting by making forgings detectable. The present teaching further relates to a method for determining an optical property of a partial or complete security feature comprised in a section of such a sheet-like product.

BACKGROUND

In WO 2015/079014 A1 a system for producing security tags has been described. Basically, they are produced by cutting patches from a raw material and randomly scattering those on a substrate material and/or the object itself. The raw material feed is subject to manufacturing tolerances and the cutting and/or scattering therefore results in a truly random (stochastic) shape and distribution of the cut patches. These random properties can be used as unambiguous markings for objects or products. The method described in WO 2013/188897 A1 exploits these properties and stores the random features together with an object identifier in a database or on the object itself (with a cryptographic signature). This duple can later be used for visually authenticating such an object marking comprising an identifier and a random feature with a programmable device comprising a camera. However, marking of this type is relatively expensive and additional effort is required for registering each marking by producing a digital signature or initializing a database.

Therefore WO 2016/034555 A1 proposes a system to register such random security features through performing a plausibility check during the first authentication attempt. If the plausibility check is passed, the random features are recorded and enrolled in the database. This removes the necessity of registering each marking by the producer in exchange for a lower security during the first authentication attempt. One disadvantage of this method is that the recording of features during the authentication attempt may be inaccurate. When such inaccurate features are enrolled, they may compromise later authentication attempts, which do not record the same inaccuracies and thus fail the authentication.

U.S. Pat. No. 6,135,355 discloses a method and system to impede the counterfeiting of a cash card. It provides two marks, a reference mark and an issuance mark, that are arranged in a distance on a card. Said distance and other properties of the marks (for example their shape) are encrypted and stored on a magnetic stripe of the card. The distance, the shape and the position of the marks differ from card to card. The reference mark may be a hologram, a barcode image, a graphic image or a reference hole.

EP 2 937 818 A discloses a two-dimensional marker, which in one embodiment comprises a QR code and a hologram portion.

SUMMARY

It is an object of the present teaching to avoid some of the disadvantages of the known methods in order to allow for small sections of the sheet-like product that can be used for security tags and are suited for use in an automatic or semi-automatic visual authentication scheme.

In order to achieve the objective mentioned above, the present teaching provides a sheet-like product as defined in the outset, wherein the sheet-like product comprises two or more markers, wherein each marker comprises at least one member selected from a group consisting of: a machine-readable code, a human-readable code, and an identifier, and wherein each marker is uniquely identifiable. In particular both, the position of the at least one security feature on the sheet-like product and the position of the at least one marker on the sheet-like product, may be predetermined with respect to the sheet-like product. In this context "being predetermined" means that the (relative) position is fixed and known to the producer of the sheet-like product either because it is a mandatory result of the production process or because it is recorded (determined) and stored after the production process prior to use of the sheet-like product (e.g., by cutting sections from it). The security feature(s) may generally be any visually detectable overt security feature(s). It/They may comprise optically detectable three-dimensional structures or materials with optical properties that differ depending on the viewing angle. The security feature(s) may bear characteristic material-features, which can be verified by a programmable device. That the relative position or the position of the security feature(s) and marker (s) are predetermined means that they are the same for each copy or instance of the sheet-like product. E.g. the positions are conditional of manufacturing of one or more sheet-like products. In order to allow for small sections of the sheet-like product that can be used for security tags, the sheet-like product comprises two or more markers, wherein each marker is uniquely identifiable. Preferably each marker can be transformed to an identifier by a programmable device comprising a camera, wherein each identifier is unique on the sheet-like product. The at least one marker comprises a machine-readable code, a human-readable code and/or an identifier. For instance, each marker may comprise a two-dimensional bar code such as a Quick Response code, or a Data Matrix code. Such codes are optimized for machine recognition and are therefore particularly suited for use in a visual authentication scheme. A human-readable code can be used for semi-automatic authentication, e.g. via SMS response or a telephone call service, wherein a user submits a request comprising the human-readable code and receives a response comprising the optical properties of one or more associated security features. A marker that comprises a code or an identifier can be identified independent of the position of the marker on the sheet-like product, i.e. purely based on the content of the marker. In a preferred embodiment of the present teaching, each of the two or more markers comprises a machine-readable code, which comprises a unique identifier.

Moreover the objective mentioned above is achieved with a method for determining an optical property of a partial or complete security feature comprised in a section of (e.g. cut from) a sheet-like product as defined above or a medium as defined below, wherein the section comprises at least one marker and at least part of a security feature, the method comprising: determining the position of the partial or complete security feature comprised in the section relative to the position of the at least one marker; using the determined relative position to retrieve the optical property of the partial or complete security feature from a map storing positions and optical properties of the security features of the sheet-like product. Determining the position of the partial or complete security feature relative to the position of the at least one marker includes examining the section for any included security features and markers and locating each of them to determine the relative position(s). The map may store the positions of the security features relative to the marker positions; alternatively, it may store security feature and marker positions relative to a common origin, thus allowing for determination of relative positions.

The present teaching is an advancement to the compound or common use of previously referenced art. It is based on the realization that by providing a suitable raw material in the form of the present sheet-like product, information on the properties of the security feature(s) available during production may be used for accessing those properties (e.g. for enrollment and/or verification). In order to access that information, it may be linked to the security feature. That link should withstand the randomization process (e.g. cutting sections from the raw material). It must also be secure, i.e. not easy to forge, or otherwise the validity of a verification based on it is at risk. The present teaching proposes the use of at least one marker on the sheet-like product, wherein the marker and its position relative to the security feature can be used as the link mentioned above, i.e. to access previously available information on the properties of the security feature(s). The number, size and distribution of markers on the sheet-like product can be adapted accordingly for withstanding the randomization process, i.e. such that every section comprises at least one marker. The marker should be visually detectable, such that it can be recognized by a programmable device comprising a camera. In order to provide an unambiguous link, the marker should be uniquely attributable to a position on the sheet-like product. With this information and presuming that the position of the security feature(s) on the sheet-like product is predetermined relative to the position of the marker(s), a security feature on the same section as a marker is linked to the marker via its relative position.

Correspondingly the present method may for determining the position of the at least one marker (i.e. to which the marker is attributed) comprise: identifying the at least one marker and retrieving the optical property of the partial or complete security feature from the map based on the identity of the at least one marker and the position of the partial or complete security feature relative to the identified marker. In that way a disambiguation between two or more markers of the sheet-like product can be performed.

Each marker may advantageously comprise an encoded identifier, wherein the encoding of the encoded identifier comprises information for error detection or error correction. Thus when the marker is read out, error-correction or error-detection methods may be applied in order to reliably determine the content and/or identity of the marker.

Alternatively or additionally, the marker may comprise an encoding of the optical properties of at least one adjacent security feature identified by its position relative to the marker. Thereby the marker may directly store the optical properties of the adjacent partial or complete security feature. In this embodiment, the map that can be used in the inventive method as described above, which map stores (in this case relative) positions and optical properties of the security features, is directly embedded within the sheet-like product itself. The method for authentication of a resulting security tag can therefore operate in a distributed way, i.e. not limited to situations where a centrally stored map can be accessed (e.g. via an available internet connection).

It has turned out particularly useful that the at least one security feature overlaps with the at least one marker or is part of the at least one marker. In this case the marker and the security feature can be located in overlapping areas on the surface of the sheet-like product. This decreases the chance of obtaining sections without both a marker and a security feature (such sections cannot benefit from the present teaching) when randomly cutting the sheet-like product. One example for such an overlap would be that each black dot in a marker comprises a security feature. In this case the security features hardly interfere with the read out of the marker.

Different types of security features can benefit from the advantages of the present teaching. Preferably the at least one security feature comprises an optical variable device (brief "OVD"). An OVD is essentially an iridescent image that exhibits various optical effects such as movement or color changes when regarded from different viewing angles.

In a preferred embodiment, the at least one security feature comprises two or more optical variable devices placed side by side, wherein the two or more optical variable devices have different optical properties (e.g. different diffraction starting angles). The arrangement of OVDs side by side or adjacent one another has the advantage that the viewing angle is the same at least at the border between them. Thus the presence of the security feature can be easily recognized and verified with a programmable device comprising a camera through ensuring that the two OVDs appear differently.

The sheet-like product according may be a sheeting or a film. In this case it can be processed easily, including storage, transport and cutting. More particularly, the sheet-like product may be a holographic sheet or a holographic film which can be processed by standard printing means, e.g. cold- or hot-foiling, over-printing or thermo-transfer.

Furthermore the present teaching also foresees a medium (e.g. a substrate) comprising two or more sheet-like products as defined above arranged in a tiled manner. In this way a larger number of sheet-like products can be provided efficiently. The markers are unique within one sheet-like product, i.e. one tile or period of the arrangement making up the medium, but repeat in a periodic manner. In order to resolve ambiguities during read-out of the marker, boundary conditions (i.e. tile edges) may be considered and accounted for.

In a preferred variant of the present method, it may be foreseen to locate a reference mark of the section and to use the determined position of the reference mark together with the determined position of the marker to retrieve the optical property of a partial or complete security feature comprised in the section. Thus the information of the marker is complemented by the information of the reference mark and their relative arrangement in order to access information concerning a present security feature.

Specifically, a boundary of the section (or patch) can be used as the reference mark. Together with the knowledge about the position of the marker, the boundary or edge of the section of the sheet-like product allows to determine which security features are to be expected within said boundary. Thus it allows to reliably identify missing security features in addition to security features having incorrect optical properties.

In a preferred embodiment, the offset between the at least one marker and the reference mark is subject to manufacturing tolerances and can therefore be used as a random security feature. The random security feature can be used as an authentication feature of a security tag produced from the sheet-like product.

Finally the present teaching concerns an application as a method for authenticating (i.e. verifying the authenticity of) a security tag comprising a section of a sheet-like product or medium as defined above, the method comprising: determining an optical property of a partial or complete security feature comprised in said section according to the method steps described previously, determining an optical property of the partial or complete security feature comprised in said section using at least one image sensor, comparing the determined optical properties, and confirming the authenticity of the security tag if the compared optical properties are in agreement. With this method sections originating from the sheet-like product can be confirmed and authenticated by verifying that the actually present security/material features correspond to the predetermined information from the production of the sheet-like product.

BRIEF DESCRIPTION OF THE DRAWINGS

In the following, the present teaching will be explained further by means of particularly preferred embodiments to which it is not to be restricted, though, and with reference to the drawings. The drawings show in detail.

DETAILED DESCRIPTION

Figure 1:
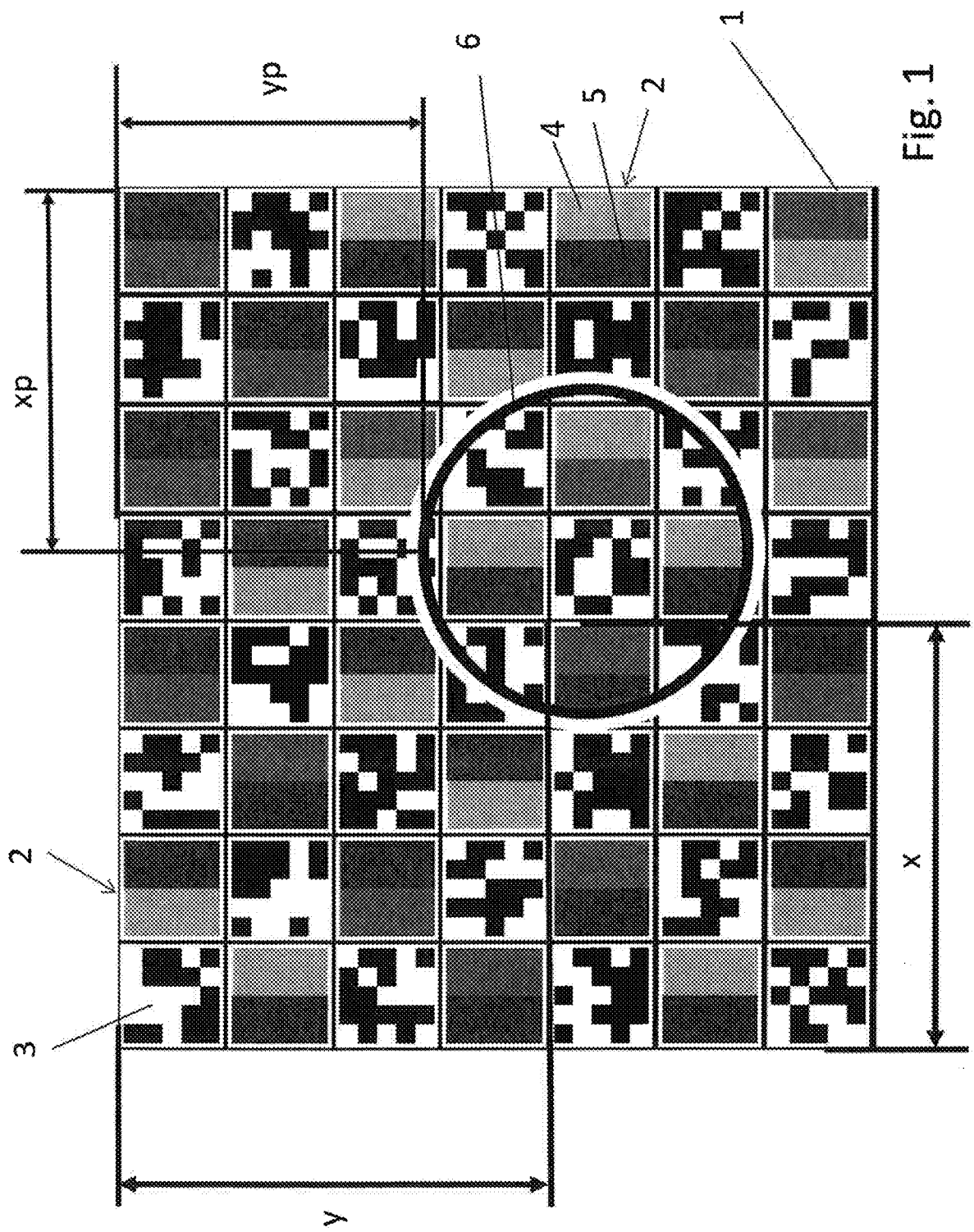
FIG. 1 schematically a view of one side of a sheet-like product according to the present teaching.

FIG. 1 shows a sheet-like product 1 forming a raw material, e.g. a sheeting, a film or a foil, or being part thereof. The sheet-like product 1 comprises twenty-eight security features 2 having optical properties that change with the viewing angle. The sheet-like product 1 also comprises twenty-eight markers 3. In this example the security features 2 and markers 3 are arranged in a grid in an alternating manner. However in different embodiments the security features 2 may also overlap with the markers 3 or be part of the markers 3.

Each marker 3 is uniquely identifiable and uniquely attributable to a position on the sheet-like product 1. Each marker 3 should be readable by a programmable device comprising a camera (e.g. a smartphone or tablet). The markers 3 in this example are two-dimensional codes comprising an encoded identifier. Of course any codes similar to common 1D or 2D barcodes, i.e. Data Matrices, can be used for the markers 3. Each encoded identifier is unique across the sheet-like product 1, i.e. for each marker 3. The encoding of the encoded identifier comprises information for error detection or error correction, e.g. for using encoding strategies which employ error-corrective codes (ECC), e.g. Reed-Solomon. The use of such codes aids robust/reliable decoding and furthermore ensures that if a marker 3 is decoded, it has the correct content. There is therefore a close to 100% probability that if a marker 3 is decoded, the identifier resulting from the decoding is correct, i.e. it is equal to the identifier encoded during production or design of the sheet-like product 1.

Each security feature 2 comprises two or more optical variable devices 4, 5 placed in an adjacent manner (e.g. side by side). The two or more optical variable devices (OVDs) 4, 5 can either have distinct optical characteristic or share the same principal optical characteristics but have different diffraction starting angles and therefore appear differently from any one viewing angle, which is indicated by different shades in FIG. 1. FIG. 1 shows an example of a security feature comprising two different OVDs. For simplicity we will subsequently use examples referring to so-structured security features with two OVDs. All examples can trivially be extend to security features comprising multiple OVDs. For evaluation with a programmable device's camera we can independently look at the OVD left 5 and the OVD right 4 within a security feature 2 and examine differences in their appearance. If they are not differing or show unexpected behavior, verification fails and we can hence conclude that somebody tried to tamper the security tag, e.g. a plausibility check fails and the enrollment is interrupted. To provide the optical variable devices, the sheet-like product 1 may be a holographic sheet or a holographic film. The positions of the security features 2 on the sheet-like product 1 are predetermined relative to the positions of the markers 3 on the sheet-like product 1.

Furthermore, preferably in a controlled environment, the iridescent effects of the OVD left 5 and the OVD right 4 can be used to determine their characteristics and optical properties. As they can so be attributed to distinct characteristics, we can discriminate among different types of security features, e.g. between different starting-angle combinations of the left 5 and right 4 OVD within a security feature 2.

Figure 2:
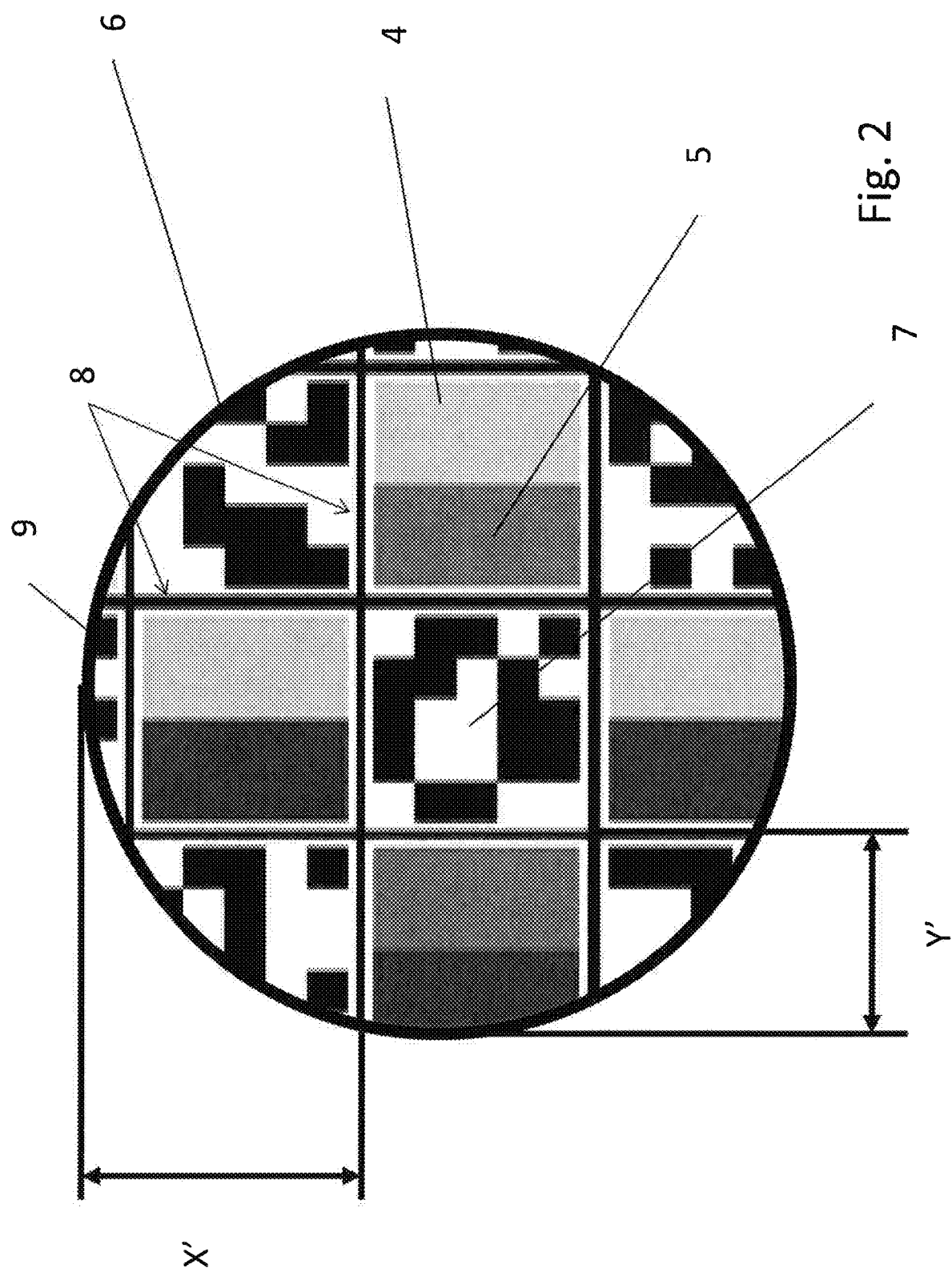
FIG. 2 a detailed view of a section cut out of the sheet-like product according to FIG. 1.

The sheet-like product 1 is designed as a raw material for producing security elements or tags for marking and authenticating products. Such authentication can rely on verifying the presence and properties of security features, which are relatively difficult to copy. A preferred use of the sheet-like product 1 thus is to cut sections 6 out of the sheet-like product 1 and use the resulting sections 6 in security elements for product marking. The advantages of such use become apparent in a method for determining an optical property of a partial or complete security feature comprised in a section 6 of the sheet-like product 1 shown in FIG. 2. This method can preferably be performed by a programmable device comprising an optical sensor, e.g. a smartphone or a dedicated scanner.

The section 6 comprises at least one complete marker 7 and parts of multiple security features 8. When performing the method, first the position of one of the partial or complete security feature 8 comprised in the section 6 is determined relative to the position of the marker 7. Then the determined relative position is used to retrieve the optical property of the partial or complete security feature 8 from a map (not shown) storing positions and optical properties of all the security features 2 of the sheet-like product 1. In particular the marker 7 is first identified and the optical property of the partial or complete security feature 8 is retrieved from the map based on the identity of the marker 7 and the position of the partial or complete security feature 8 relative to the identified marker 7. Additionally, a reference mark of the section 6, e.g. the boundary 9 of the section 6, may first be located and the determined position of the reference mark may be used together with the determined relative position of the security feature 8 and the identity of the marker 7 to retrieve the optical properties of a partial or complete security feature 8 from the map.

A preferred application of the above method is for authenticating a security tag comprising a section 6 of a sheet-like product 1. The authentication includes additional steps that can be performed on the programmable device. On the one hand the optical properties of the partial or complete security feature 8 comprised in the section 6 are determined as described above, i.e. by accessing prior knowledge of the optical properties. On the other hand the optical properties of the partial or complete security feature 8 comprised in said section 6 are determined using at least one image sensor, i.e. essentially by performing a measurement. Then the determined optical properties are compared and the authenticity of the security tag is confirmed if the compared optical properties are in agreement.

For enrolling an association between a product identifier (e.g. serial number) and a security tag comprising a random security feature such as a random section 6, the security feature or its optical properties first need to be detected. The detection of such features is described in more detail in WO 2013/188897 A1. The enrollment procedure is described in more detail in WO 2016/034555 A1. It is well known that detection of security features such as those formed with optically diffractive devices, holographic foils or other OVDs, is prone to misdetections and inaccuracies. Consequently it may happen that a misdetection of a security feature is significantly off its true value. Enrolling such a misdetected security feature consequently may lead to false decisions in later authentication attempts.

With the present teaching an image of a section 6 cut from the sheet-like product 1 is captured, which contains at least one marker 7 and one security feature 8 which has typical characteristics for the security material and resulting optical properties that change with the viewing angle. The marker 7 can be detected and the identifier retrieved from the marker 7 with close to 100% certainty correct. The programmable device comprising a camera can be configured to also detect the position X', Y' of the marker 7 within the section 6 relative to a reference mark, which could but doesn't have to be the boundary 9 of the section 6, its center point or a similar property.

The producer who produces the raw material comprising the sheet-like product 1 naturally has exhaustive knowledge on its structure and properties, i.e. knows all markers 3, their absolute locations x, y and the characteristic material features and optical properties of all security features 2. Alternatively the producer produces a random foil involving stochastic processes and after production uses a camera to extract the marker positions and optical properties of the produced security features etc. (hence building up the exhaustive knowledge). This has the benefit of randomly generating different instances of the raw material. Using the identifier decoded from the marker 7 of a section 6 together with the relative marker position X', Y' within the section 6 and the known absolute location x, y of the marker 7, the exact stamping position xp, yp of the section 6 can be determined.

By knowing the stamping or cutting position xp, yp and the dimensions of the section 6, the exhaustive knowledge on the sheet-like product 1, which can be stored in a map, can be used to look up the optical properties of the security features 8 comprised in the section 6. These optical properties can then be used for an improved (and hence more secure) plausibility check in an enrollment and registration procedure such as the one disclosed in WO 2016/034555 A1, i.e. for enrolling the optical properties of a security tag (comprising the section 6) in association with a unique product identifier (e.g. a serial number) applied to the product together with the security tag.

The cutting position xp, yp of the section 6 is preferably random due to manufacturing tolerances or by intentionally introduced stochastic processes (like feeding the raw material to a cutter etc.). It can therefore be used as an additional random feature in a product marking based authentication system, such as the one introduced in WO 2013/188897 A1. Even more so, the information on the optical properties of the security features 2 may be used to confirm that the section 6 indeed originates from an authentic raw material, i.e. comprising an authentic sheet-like product 1.

Figure 3:
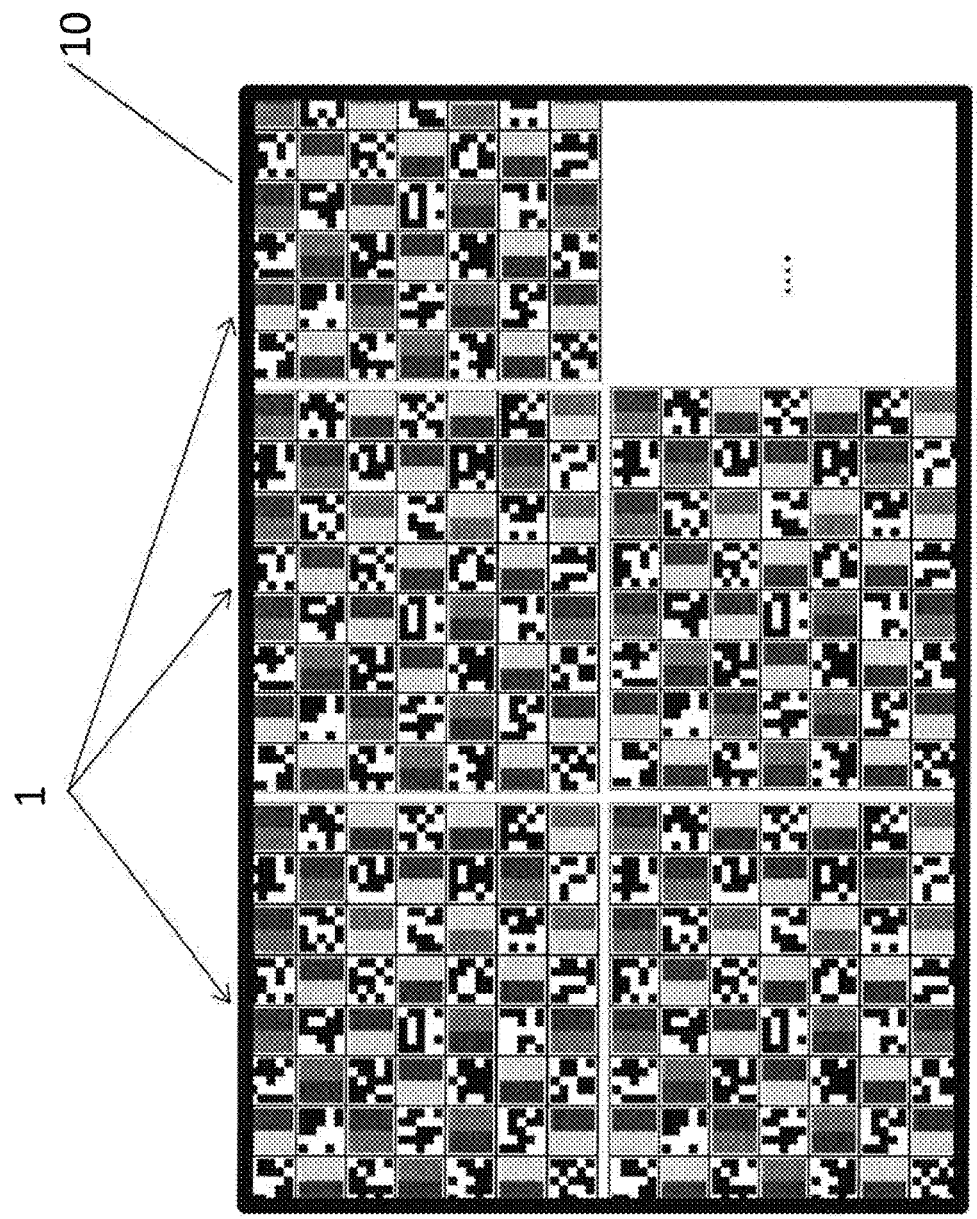
FIG. 3 a medium comprising a tiled arrangement of multiple sheet-like products according to FIG. 1.

FIG. 3 shows a medium 10 according to the present teaching, where multiple sheet-like products 3 are arranged in a tiled manner, such that the medium 10 can be used as a raw material for producing security tags as described above.

The invention claimed is:

1. A sheet-like product comprising:
at least one security feature having optical properties that change with the viewing angle, and
two or more different markers at different positions of the sheet-like product,
wherein each marker comprises a machine-readable code,
wherein the two or more different markers are independent of the viewing angle,
wherein a position of the at least one security feature on the sheet-like product is predetermined relative to the positions of the two or more different markers on the sheet-like product.

2. The sheet-like product according to claim 1, wherein each marker comprises exactly one machine-readable code and wherein the machine-readable code of each marker is independent of the viewing angle.

3. The sheet-like product according to claim 1, wherein each marker is uniquely attributable to a position on the sheet-like product.

4. The sheet-like product according to claim 3, wherein each marker is uniquely identifiable.

5. The sheet-like product according to claim 1, wherein each marker includes an encoded identifier, wherein the encoding of the encoded identifier includes information for error detection or error correction.

6. The sheet-like product according to claim 1, wherein the marker includes an encoding of optical properties of at least one adjacent security feature identified by its position relative to the marker.

7. The sheet-like product according to claim 1, wherein the at least one security feature overlaps with the at least one marker or is part of the at least one marker.

8. The sheet-like product according to claim 1, wherein the at least one security feature has an optical variable device.

9. The sheet-like product according to claim 8, wherein the at least one security feature has two or more optical variable devices placed side by side, wherein the two or more optical variable devices have different optical properties.

10. The sheet-like product according to claim 1, wherein the sheet-like product is a sheeting or a film.

11. The sheet-like product according to claim 10, wherein the sheet-like product comprises a holographic sheet or a holographic film.

12. A security tag, comprising the sheet-like product according to claim 11.

13. A sheet-like product, comprising:
a security feature having physical optical properties that change with the viewing angle;

two markers at different positions of the sheet-like product, each having a unique machine-readable code;

wherein the two or more different markers are independent of the viewing angle;

wherein a position of the security feature is predefined relative to the different positions of the two markers such that expected optical properties of the security feature can be determined based on the machine-readable code of one of the two markers.

14. A security tag, comprising the sheet-like product according to claim 13.

15. The security tag according to claim 14, wherein the security feature comprises two or more optical variable devices placed side by side, each having different optical properties.

16. The security tag according to claim 14, wherein the one of the two markers includes an encoding of the expected optical properties of the security feature.

17. A sheet-like product comprising:

at least one security feature having optical properties that change with the viewing angle, and two or more different markers at different positions of the sheet-like product, wherein each marker comprises a machine-readable code, wherein at least one adjacent security feature is arranged adjacent to at least one of the two or more different markers, wherein a position of the at least one security feature on the sheet-like product is predetermined relative to the positions of the two or more different markers on the sheet-like product.

18. The sheet-like product according to claim 17, wherein the machine-readable code of each marker encodes optical properties of the at least one adjacent security feature identified by its position relative to the marker.

19. The sheet-like product according to claim 17, wherein the machine-readable code of each marker comprises an identifier, wherein the identifier uniquely identifies optical properties of the at least one adjacent security feature.

20. The sheet-like product according to claim 17, wherein the two or more different markers are independent of the viewing angle.

21. A security tag, comprising the sheet-like product according to claim 17.

* * * * *